J. LOOK.
Joiners' Plane.

No. 165,742.

Patented July 20, 1875.

Witnesses.
S. N. Piper
L. N. Collen

Joseph Look,
by his attorney.

UNITED STATES PATENT OFFICE.

JOSEPH LOOK, OF SOUTH ABINGTON, MASSACHUSETTS, ASSIGNOR TO BRIGHAM, LITCHFIELD & VINING, OF SAME PLACE.

IMPROVEMENT IN JOINERS' PLANES.

Specification forming part of Letters Patent No. 165,742, dated July 20, 1875; application filed March 15, 1875.

*To all whom it may concern:*

Be it known that I, JOSEPH LOOK, of South Abington, of the county of Plymouth and State of Massachusetts, have invented a new and useful Improvement in Joiners' Planes; and do hereby declare the same to be fully described in the following specification and represented in the accompanying drawings, of which—

Figure 1:
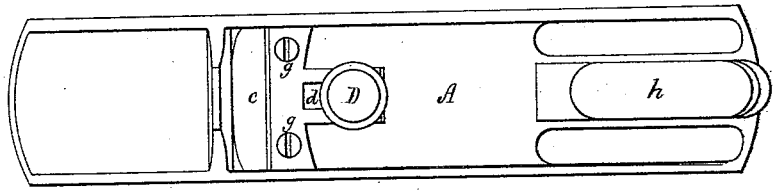
Figure 2:
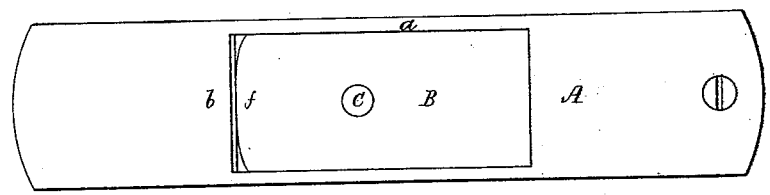
Figure 3:
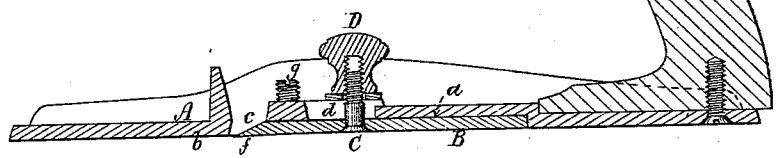
Figure 4:
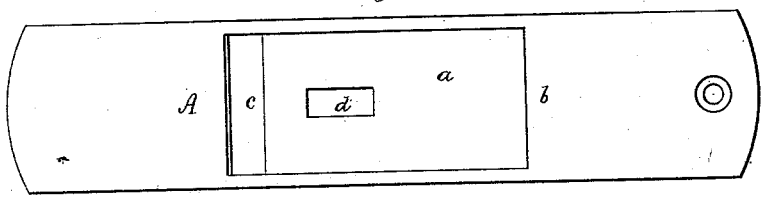
Figure 5:
Figure 6:
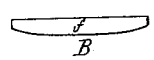
Figure 7:
Figure 7:
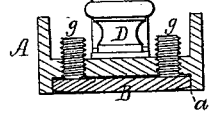

Figure 1 is a top view, Fig. 2 a bottom view, and Fig. 3 a longitudinal section, of one of my improved planes. Fig. 4 is a bottom view, and Fig. 5 a transverse section, of the stock. Fig. 6 is a front-end view, and Fig. 7 an edge view, of the cutter or plane-iron, which is crowned or curved transversely on its lower surface for some distance back from the cutting-edge.

The plane is designed for cutting or planing across the grain of wood perpendicularly, or about so, thereto. Instead of arranging the cutting-iron sloping in the stock, or at an acute angle to the bearing-surface of the plane, it is disposed substantially or approximately parallel thereto, and is wholly arranged within the stock, or a cavity or recess made lengthwise therein, the cutter being on its under surface, and at and back from its cutting-edge, arched or crowned a little transversely, as shown.

In the drawing, A denotes the stock, made with a cutter-receiving recess, *a*, arranged in it, and with respect to its bearing-face *b*, in manner as shown, there being a chip-throat, *c*, leading upward out of said recess *a* and through the stock, in manner as represented. Besides the said throat *c*, there is a slot, *d*, arranged lengthwise in the stock, and to open upward out of the recess *a*. The cutter or plane-iron shown at B is placed flatwise in the recess *a*, and with the rear part of its lower surface flush with the bearing-surface *b*, the cutting-edge *f* projecting partly across the chip-throat. A screw, C, formed as shown, goes up through a countersunk hole in the cutter, and also through the slot *d*, and is provided with a clamp-nut, D, such serving to hold the cutter in place in the stock. In advance of the said screw and nut are two adjusting-screws, *g g*, which, arranged as shown, screw down into and through the stock and against the plane-iron, they serving to determine the projection of its cutting-edge below the bearing-surface of the stock, such stock being provided with a handle, *h*, arranged as represented.

It will be seen, that while such a plane is being used to cut across the end or grain of a piece of wood, the cutter will stand at, or nearly at, a right angle with the said grain, and therefore will operate to much better advantage than a cutter having a slanting position in the stock, as plane-irons are usually arranged.

I prefer to curve or crown the cutter in manner as shown and described, but a plane-surface cutter may be used. The curved one, however, for various kinds of planing, especially for reduction of vessels' knees or ribs, will operate much better than a plane-surface cutter.

I claim—

In the improved plane, the cutter B, its receiving-recess *a*, chip-throat *c*, and holding and adjusting screws C D, *g g*, arranged in and with the slotted bottom of the stock A, all substantially as described and shown.

JOSEPH LOOK.

Witnesses:
GEORGE A. CLIFT,
ALBERT DAVIS.